Dec. 27, 1966 W. BERGHOLTZ ETAL 3,294,921
TRUNK-GROUP SUPERVISION
Filed May 14, 1963
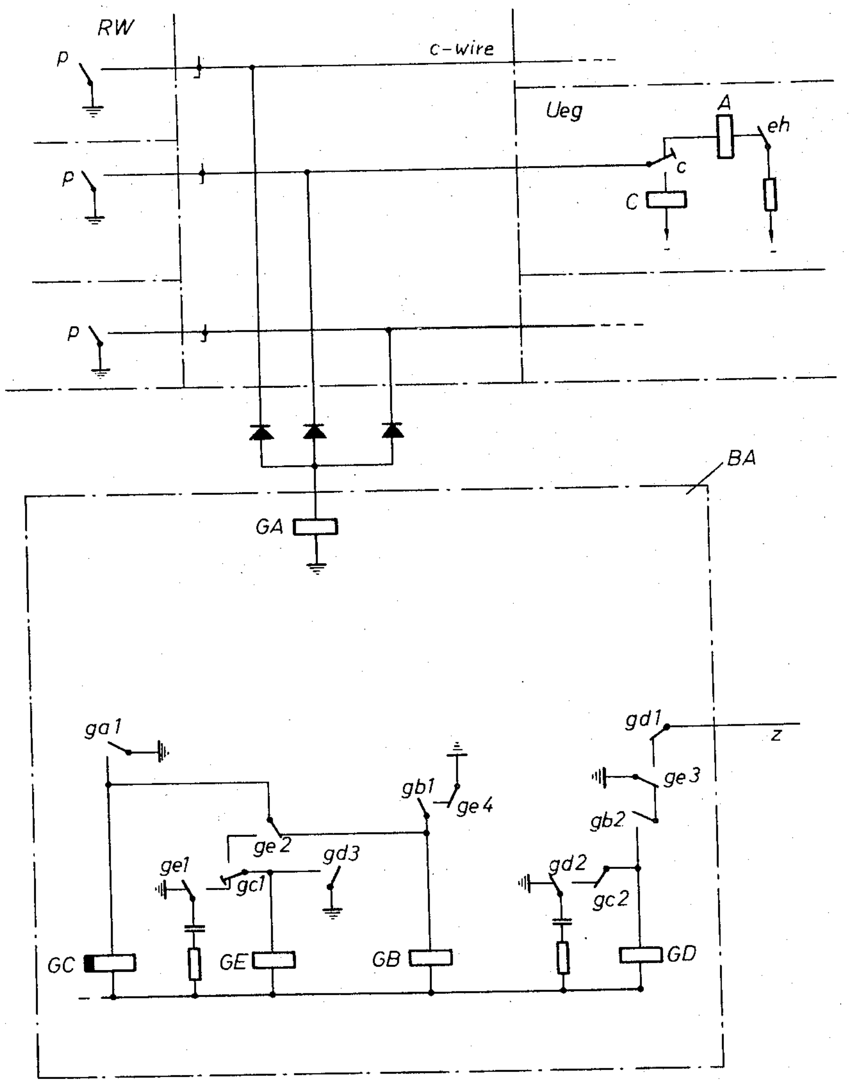
INVENTORS
W. BERGHOLTZ
B. KRAUSE
BY Paul W. Hemminger
ATTORNEY United States Patent Office 3,294,921

Patented Dec. 27, 1966

3,294,921

TRUNK-GROUP SUPERVISION

Willy Bergholtz, Stuttgart-Zuffenhausen, and Bernhard Krause, Kornwestheim, Germany, assignors to International Standard Electric Corporation, New York, N.Y., a corporation of Delaware Filed May 14, 1963, Ser. No. 280,267
Claims priority, application Germany, June 8, 1962, St 19,336
4 Claims. (Cl. 179—18)

This invention relates in general to supervising arrangements for telephone systems and in particular to arrangements for supervising the busy or idle condition of trunk line repeaters associated with selector stage levels.

In known systems, the busy or idle condition of a trunk line is marked and the control equipment checks such marking to ascertain that the desired trunk line is idle before the switching equipment is operated to establish a connection thereto.

It often occurs that after a trunk line is found idle marked, and before a connection is established thereto, that such trunk line becomes busy as a result of seizure by different equipment. Conversely, a trunk line may be marked busy when it is being tested and may thereafter become idle immediately without the control equipment receiving notification of such change. Under both of the above conditions, valuable switching time is lost, and all trunks busy signal is erroneously received or overflow switching equipment is used needlessly.

An object of this invention is to provide a supervisory arrangement which alters the busy or marking potential immediately after the trunk equipment is seized or is released, even before the time necessary for complete preparedness or release has elapsed. This is accomplished by providing a quick acting device in each trunk line equipment which immediately responds to a seize or disconnect signal without waiting for other items of apparatus to operate or restore. In these quick acting supervisory circuits, the idle or busy marking signals can be erroneously sent if the supervisory equipment is not designed to compensate therefor. Accordingly, it is another object of this invention to provide a supervisory circuit which is immune to false signals simulating a portion of an all-trunks-busy or one-trunk-idle condition.

Other objects and features of the invention will become apparent and the invention will be best understood when the specification and claims are read in conjunction with the drawing which shows partial circuit diagrams of a trunk repeater, the trunk idle or busy condition indicating circuit and associated routing selector equipment.

When the routing selector RW releases the trunk repeater U*eg*, ground is removed from the *c*-wire and relay C in the trunk repeater is released. Thereafter a negative potential appears on the *c*-wire when the terminating repeater releases the connection and the repeater is marked idle. This negative potential passes through the isolating rectifier associated with the *c*-wire just marked idle and relay GA is operated. Relay GA is connected in parallel to all *c*-wires through separate rectifiers and as long as any repeater is idle, relay GA is operated. When all repeaters are busy, the ground from the *p*-contacts of the connected routing selectors causes the release of relay GA.

In the condition when at least one trunk repeater is idle and relay GA is operated, relays GC and GE are operated through contacts *ga*1. When an all-trunks-busy condition is encountered, relay GA restores, and releases relays GC and GE. The restoration of relay GE removes ground from wire *z* when contacts *ge*3 open giving an all-trunks-busy indication.

Assuming that all repeaters are busy, relays GA, GC and GE are restored. When a routing selector releases one of the trunk repeaters, ground is removed from the *p*-contact and a negative voltage is applied to the *c*-wire and passes through the isolating resistor to operate relay GA. This negative voltage is only applied while wire *c* is ungrounded and is removed when relay C of the outgoing repeater is restored.

Contacts *ga*1 operate relay GB which locks operated through its contacts *gb*1. Contacts *gb*2 operate relay GD which through its contacts *gd*3 operates relay GE. Relay GE, at its contacts *ge*3, opens the operate circuit of relay GD and at its contacts *ge*4 releases relay GB.

Relay GD releases slowly since contacts *gd*2 connected a resistor capacitor circuit in parallel with its winding. After the release time for relay GD has elapsed, contacts *gd*1 prepares a ground marking circuit for the *z* wire.

When contact *gd*3 opens, relay GE is held operated by contacts on relays GA and GC. Relays GE and GA are the only relays operated.

If a normal release occurs, relay GA had its contacts *ga*1 closed and slow operating relay GC operates. The delay time of relay GC has been selected to preclude momentary voltage pulses from simulating a true disconnect.

If a disconnect signal was received during the dropping time of relay GE, when relay GC operates, its contacts *gc*1 connect relay GE to contact *ga*1 through contacts *gc*1 and *ge*2. Immediately upon the operation of relay GC, the resistor-capacitor circuit associated with relay GD is opened and relay GD immediately restores replacing ground on wire *z* to remove the all-trunks-busy signal.

If an all-trunks-busy condition is just encountered and shortly thereafter a repeater becomes idle, relay GA restored and then reoperated. Relay GC then operates and restores relay GD to apply ground to the wire *z*.

It can thus be seen that the advantage of quick supervision is provided without false disconnect signals adversely affecting the operation of the supervisory circuit.

While the principles of the invention have been described above in connection with specific apparatus, it is to be clearly understood that this description is made only by way of example and not as a limitation to the scope of the invention.

We claim:

1. A telephone system supervisory arrangement for signalling the availability of trunk lines to trunk-line routing equipment operable to establish a connection therewith, comprising a group of trunk line repeaters each including means for generating idle and busy marks according to the busy and idle condition of said repeater, availability means common to said repeaters and operable responsive to the generation of a busy mark by all repeaters simultaneously for indicating to said routing equipment an all-trunks-busy condition, and means in each repeater responsive to a change in the availability of the repeater for generating a preliminary mark for controlling said availability means to terminate the said all-trunk-busy condition.

2. A telephone system supervisory arrangement as set forth in claim 1 wherein said preliminary mark has a predetermined duration.

3. A telephone system supervisory arrangement as set forth in claim 2 wherein the said duration of the said preliminary mark is less than the operating time of said trunk-line routing equipment.

4. A telephone system supervisory arrangement as set forth in claim 1 wherein said availability means includes means for discriminating between said prelimnary mark and false marks of different time durations.

References Cited by the Examiner

UNITED STATES PATENTS

| | | | |
|---|---|---|---|
| 2,636,945 | 4/1953 | Den Hertog et al. | 179—16 |
| 2,709,203 | 5/1955 | Buchner | 179—18 |
| 3,041,410 | 6/1962 | Stenger | 179—43 |

KATHLEEN H. CLAFFY, *Primary Examiner.*

WILLIAM C. COOPER, *Examiner.*